United States Patent [19]
Yasui et al.

[11] Patent Number: 5,745,247
[45] Date of Patent: Apr. 28, 1998

[54] IMAGE FORMING APPARATUS HAVING A CONTROLLED FIXING UNIT

[75] Inventors: Motokazu Yasui; Yasuhisa Kato, both of Yokohama, Japan

[73] Assignee: Ricoh Company, Ltd., Tokyo, Japan

[21] Appl. No.: 379,927

[22] Filed: Jan. 27, 1995

[30] Foreign Application Priority Data

Jan. 28, 1994 [JP] Japan .................... 6-008305

[51] Int. Cl.⁶ .................. H04N 1/00; H04N 1/29; H04N 1/32; G03G 21/00
[52] U.S. Cl. .................. 358/296; 358/300; 358/468; 399/67; 399/69; 399/83
[58] Field of Search ................. 358/296, 300, 358/401, 444, 468, 471, 474, 486, 494, 497, 505; 219/216; 399/67, 69, 70, 82, 83, 320, 328, 335

[56] References Cited

U.S. PATENT DOCUMENTS

| | | |
|---|---|---|
| 3,989,370 | 11/1976 | Mooney . |
| 4,161,644 | 7/1979 | Yanagawa et al. ............ 219/216 |
| 4,373,801 | 2/1983 | Itoh ................................ 399/69 |
| 4,719,489 | 1/1988 | Ohkubo et al. ............... 399/67 |
| 4,878,123 | 10/1989 | Miura et al. . |
| 5,073,801 | 12/1991 | Haneda et al. ............... 399/69 |
| 5,073,868 | 12/1991 | Tada . |
| 5,307,134 | 4/1994 | Nakajima et al. ............ 399/69 |
| 5,491,557 | 2/1996 | Nakajima et al. ............ 358/296 |
| 5,521,676 | 5/1996 | Furushima ..................... 399/69 |
| 5,521,686 | 5/1996 | Muto ............................ 219/216 |
| 5,552,874 | 9/1996 | Ohtsuka et al. ............... 399/69 |

FOREIGN PATENT DOCUMENTS

| | | |
|---|---|---|
| 26 12 282 | 4/1986 | Germany . |
| 37 17 984 | 12/1987 | Germany . |
| 39 17 773 | 12/1989 | Germany . |
| 2 101 442 | 1/1983 | United Kingdom . |

Primary Examiner—Eric Frahm
Attorney, Agent, or Firm—Oblon, Spivak, McClelland, Maier & Neustadt, P.C.

[57] ABSTRACT

An image forming apparatus for reading a document image, digitizing the resulting image data, and then forming an image on the basis of the digitized image data. The apparatus is selectively operable in an ordinary mode for reading the document image every time an image is formed or in a high-speed mode for writing the digitized image data in a memory so as to form a plurality of images by a single scanning while reducing the interval between consecutive papers. A fixing unit is provided with a higher reload temperature in the high-speed mode than in the ordinary mode. This obviates a cold offset in the event of a start-up when the high-speed mode is selected.

7 Claims, 4 Drawing Sheets

IMAGE FORMING APPARATUS HAVING A CONTROLLED FIXING UNIT

BACKGROUND OF THE INVENTION

The present invention relates to an electrophotographic image forming apparatus and, more particularly, to control over a fixing unit included in the apparatus.

A digital copier capable of reading a document image, digitizing (binarizing) the resulting image data, and forming an image on the basis of the digitized image data is conventional. Usually, this type of copier is selectively operable in an ordinary mode for scanning a document image every time an image is formed or a high-speed mode for sequentially forming a plurality of images by a single scanning via a memory capable of accommodating a single document. In the high-speed mode, since a document should only be read once, it is possible to feed consecutive papers at a shorter interval than in the ordinary mode. This successfully increases the copying speed without changing the linear velocity of the copier.

However, the high-speed mode brings about various problems due to the short interval between consecutive sheets, as follows.

In the high-speed mode, a greater number of papers are passed through a fixing unit than in the ordinary mode for a given period of time, causing a heat roller to lose heat in a greater ratio (problem (1)). Therefore, in the high-speed mode, the temperature of the heat roller falls more than in the ordinary mode and results in defective fixation (problem (1-1)). Particularly, since the temperature of a press roller is low just after a warm-up, the temperature of the heat roller noticeably falls and causes a so-called cold offset to occur. The cold offset leads to toner filming on the heat roller and smears on the rear of a paper due to smears on the press roller (problem 1-2).

In the high-speed mode, the turn-on rate of a heater accommodated in the heat roller becomes higher than in the ordinary mode in order to maintain the roller at a predetermined temperature (problem 2). Hence, when a number of papers of relatively small size are continuously passed through the fixing unit in the high-speed mode, the end portions of the heat roller not contacting the papers are heated to a far higher temperature than in the ordinary mode. Such a temperature of the heat roller reduces the life of bearings, among others (problem (2-1)). In addition, when a paper of relatively large size is passed through the fixing unit just after a number of papers of small size have been continuously passed therethrough in the high-speed mode, a so-called hot offset occurs at opposite edges of the paper (problem (2-2)).

SUMMARY OF THE INVENTION

It is, therefore, an object of the present invention to provide an image forming apparatus insuring desirable fixation even in the high-speed mode.

In accordance with the present invention, an image forming apparatus selectively operable in an ordinary mode for reading a document image every time an image is formed on an image carrier or a high-speed mode for forming a plurality of images by a single reading while feeding papers at a shorter interval than in the ordinary mode has a reading unit for reading a document image and digitizing the document image, a storage for storing the digitized document image, an image forming section for forming an image representing the digitized document image on the image carrier and for transferring the image from the image carrier to a paper, a fixing unit for fixing the image transferred to the paperm and a controller for controlling the operation of the fixing unit in the ordinary mode and the high-speed mode.

DESCRIPTION OF THE PREFERRED EMBODIMENT

Figure 1:
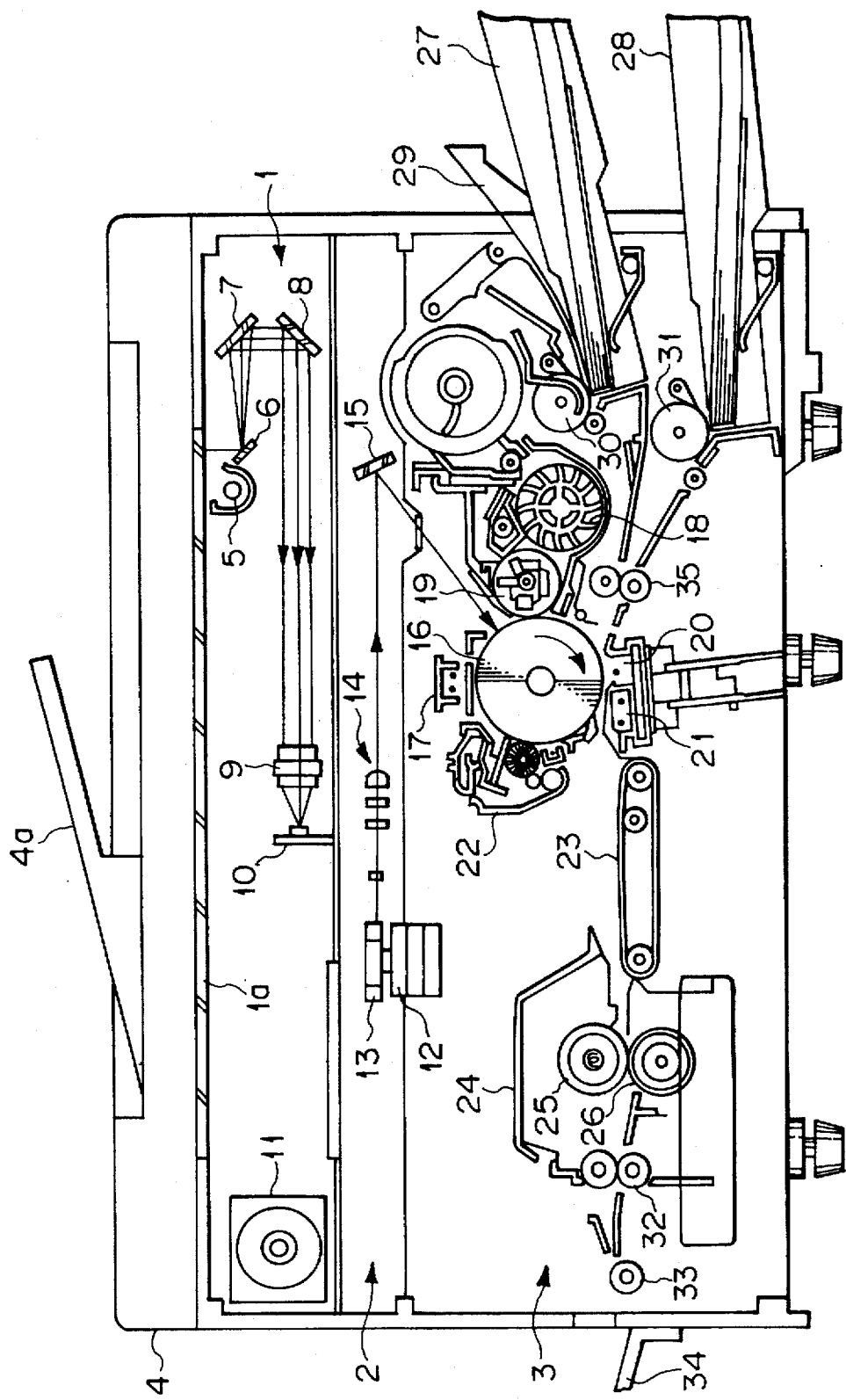
FIG. 1 is a section of an image forming apparatus embodying the present invention.

Referring to FIG. 1 of the drawings, an image forming apparatus embodying the present invention is shown and implemented as a digital copier by way of example. As shown, the copier has an image scanner 1 including a light source 5, mirrors 6, 7 and 8, a lens 9, and a CCD (Charge Coupled Device) image sensor or similar image sensor 10. The scanner 1 reads a document image on a pixel basis and generates a corresponding image signal. The image signal is digitized (binarized) and then sent to a writing section 2 or written to a memory. The reference numeral 11 designates a cooling fan. A conventional ADF (Automatic Document Feeder) 4 and a cover plate are disposed above a glass platen 1a mounted on the top of the image scanner 1. The writing section 2 has a laser diode or similar light source and an optical scanning arrangement 14 including a rotary polygon mirror 13, a motor 12 for driving the polygon mirror 12, and an f-theta lens. The writing section 1 scans, via a mirror 15, a photoconductive element 16 with a laser beam modulated by the image data from the image scanner 1, thereby writing an image on the element 16. The photoconductive element 16 is implemented as a drum and included in an image forming section 3 together with a main charger 17, a developing unit 18, a transfer charger 20, a separation charger 21, a cleaning unit 22, a fixing unit 24, and paper cassettes 27 and 28. The image forming section 3 performs an electrophotographic image forming operation and constitutes a laser printer in combination with the writing section 2. There are also shown in the figure a developing roller or sleeve 19, a conveyor belt 23, a heat roller 25 having a heater thereinside, a press roller 26, a manual paper feed table 29, pick-up rollers 30 and 31, a copy tray 34, and a registration roller pair 35.

The copier forms an image by the following procedure. After a document has been set on the glass platen 4a by the ADF 4 or by hand, a start key, not shown, is pressed. Then, the light source 5 of the image scanner 1 is turned on to illuminate the document. The resulting reflection from the document is incident to the image sensor 10 and read on a pixel basis thereby. The image sensor 10 generates an image signal representing the document image. The image signal is digitized and then sent to the writing section 2 or written to a memory, as needed. On the other hand, in the image forming section 3, the main charger 17 uniformly charges the surface of the drum 16. The writing section 2 scans the charged surface of the drum 16 with a laser beam modulated by the image data from the image scanner 1, thereby electrostatically forming a latent image thereon. The developing unit 18 develops the latent image by toner deposited on the developing roller 19 so as to produce a corresponding toner image. A paper is fed from one of the paper cassettes 27 and 28 to the drum 16 via the registration roller pair 35. The transfer charger 20 transfers the toner image from the drum 16 to the paper reached the drum 16. The paper carrying the toner image thereon is separated from the drum 16 by the separation charger 21 and a separator and conveyed to the fixing unit 24 by the belt 23. In the fixing unit 24, the heat roller 25 and press roller 26 cooperate to fix the toner image on the paper. The paper from the fixing unit 24 is driven out of the copier to the copy tray 34 by outlet rollers 32 and 33. After the image transfer, the drum 16 is cleaned by the cleaning unit 22 and then discharged by a discharge lamp, not shown, to prepare for the next image forming cycle.

The copier having the above construction is selectively operable in an ordinary mode or a high-speed mode. In the ordinary mode, a document laid on the glass platen 1a is scanned every time an image is formed. In the high-speed mode, digital image data representing the document is written to a memory so as to form a plurality of images by a single scanning. In the high-speed mode, the interval between consecutive papers is shorter than in the ordinary copy mode, resulting in the previously discussed problems (1) and (2).

Figure 2A:
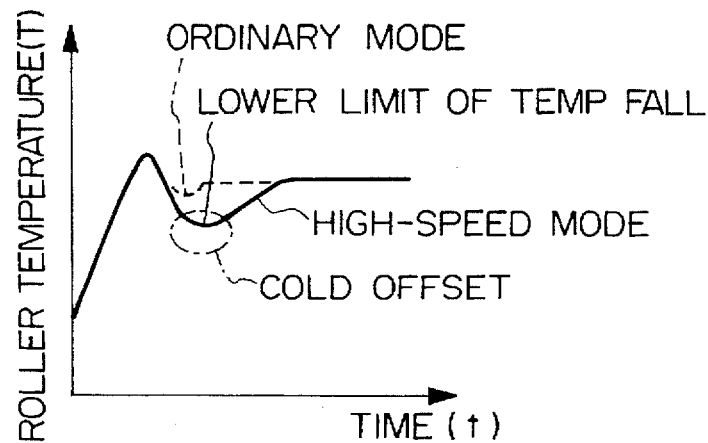
FIG. 2A is a graph indicating a drawback particular to a conventional image forming apparatus and occurring at a start-up in a high-speed mode.
Figure 2B:
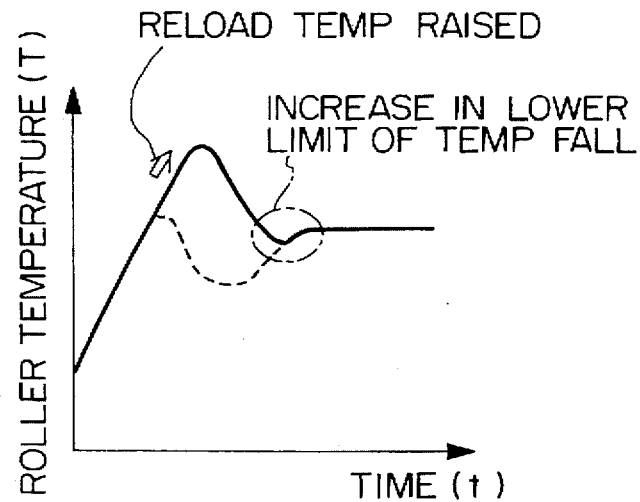
FIGS. 2B and 2C are graphs each representing a particular implementation of the present invention for eliminating the drawback shown in FIG. 2A.

Specifically, in the high-speed mode, a greater number of papers are passed through the fixing unit 24 than in the ordinary mode for a given period of time, causing the heat roller 25 to lose heat in a greater ratio. Particularly, since the temperature of the press roller 26 is low just after a warm-up, the temperature of the heat roller 25 noticeably falls, as shown in FIG. 2A. As a result, a cold offset occurs and brings about the previously discussed toner filming on the heat roller 25 and the smears on the rear of a paper due to smears on the press roller 26. This is the problem (1-2). To eliminate the problem (1-2), when the high-speed mode is selected just after the warm-up of the fixing unit 24, the present invention so controls the temperature of the heat roller 25 as to set up a higher reload temperature than in the ordinary mode, as shown in FIG. 2B. In FIG. 2B, a solid curve and a phantom curve respectively represent a specific operation particular to the present invention and a conventional operation. This successfully raises the lower limit of temperature fall of the heat roller 25 and thereby obviates the cold offset.

Figure 2C:
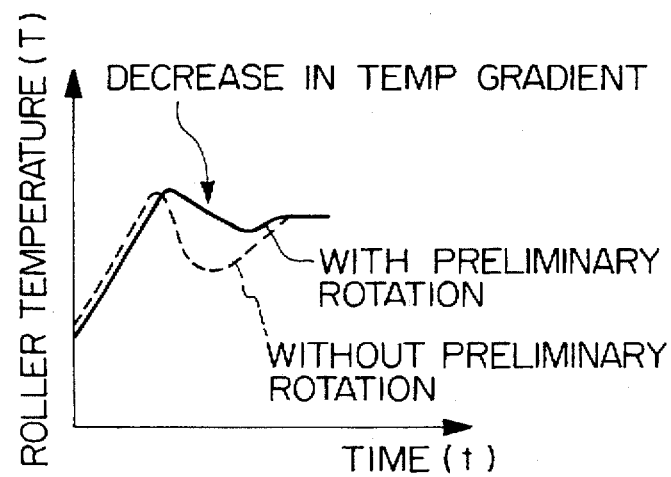

Further, in accordance with the present invention, the fixing unit 24 performs preliminary rotation in the event of a warm-up when the high-speed mode is selected. The preliminary rotation raises the temperature of the press roller 26 and, therefore, reduces the gradient of temperature fall of the heat roller 25, as shown in FIG. 2C. This is also successful to eliminate the cold offset. In FIG. 2C, a solid curve and a phantom curve respectively represent a specific operation particular to the present invention and a conventional operation. As shown, when the preliminary rotation is not effected, a greater amount of heat is released from the heat roller 5 to the press roller 26 since the temperature of the press roller 26 is lower than when such rotation is effected, thereby increasing the gradient of temperature fall. The preliminary rotation may, of course, be executed at the same time as the increase in reload temperature.

Figure 3A:
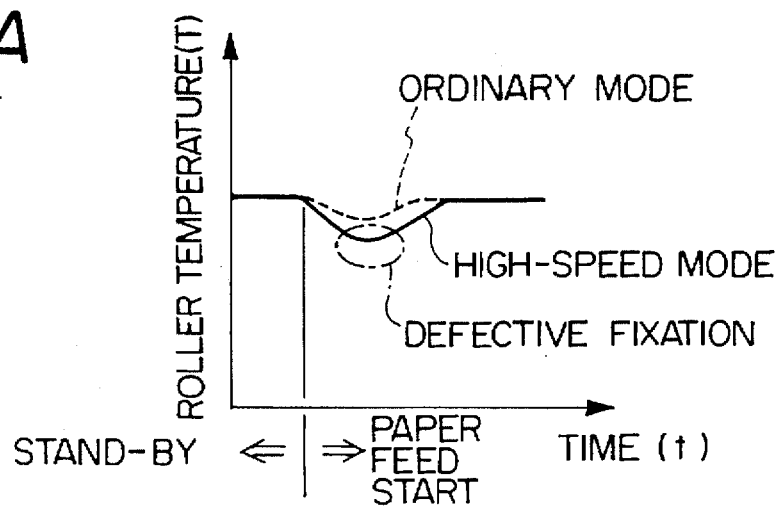
FIG. 3A is a graph indicating another drawback particular to the conventional apparatus and occurring at the beginning of paper feed in the high-speed mode.
Figure 3B:
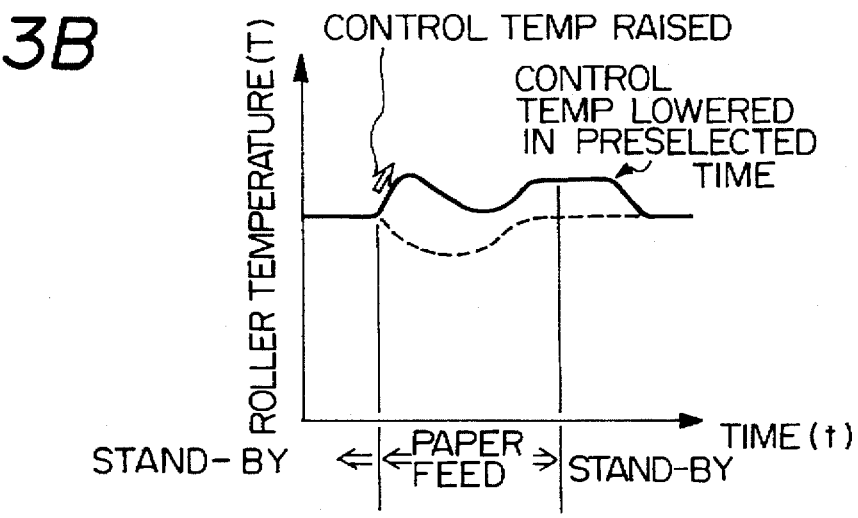
FIGS. 3B–3D are graphs each representing a particular implementation of the present invention for eliminating the drawback shown in FIG. 3A.

In the high-speed mode, a greater number of papers are passed through the fixing unit 24 than in the ordinary mode for a given period of time, causing the heat roller 25 to lose heat in a greater ratio, as stated above. In the high-speed mode, therefore, the temperature of the heat roller 25 falls more than in the ordinary mode and results in defective fixation, as shown in FIG. 3A. This is the problem (1-1) discussed earlier. When the high-speed mode is selected, the present invention raises the control temperature for the heat roller 25, as shown in FIG. 3B. In FIG. 3B, a solid curve and a phantom curve respectively represent a specific operation particular to the present invention and a conventional operation. However, when the copier is held in a stand-by state in the high-speed mode, the higher control temperature will raise the temperature inside the copier, compared to the ordinary mode, thereby adversely effecting the other units of the copier. In light of this, when the stand-by state in the high-speed mode continues over a predetermined period of time, the present invention automatically replaces the high-speed mode with the ordinary mode. Consequently, the control temperature for the heat roller 25 is lowered to reduce temperature elevation in the copier.

Figure 3C:
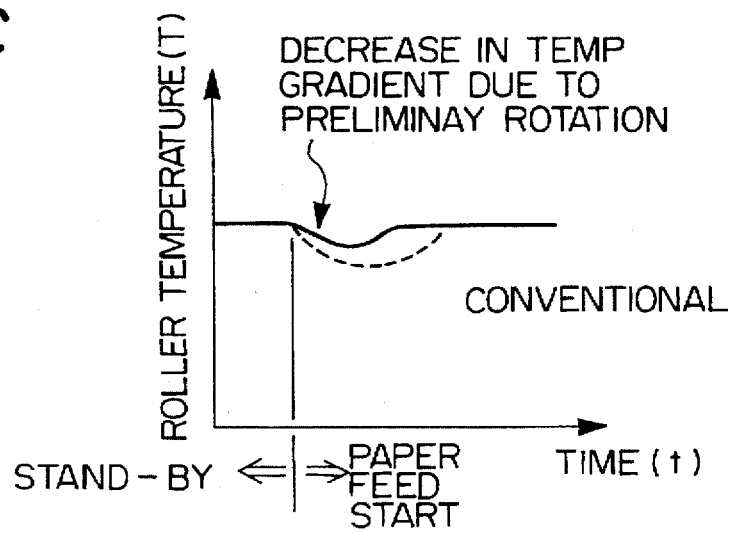

Furthermore, assume that the high-speed mode is selected while the copier is in a stand-by state in the ordinary mode. Then, the present invention causes the fixing unit 24 to perform preliminary rotation before image formation begins, thereby raising the temperature of the press roller 26. As a result, the gradient of temperature fall of the heat roller 25 is reduced, as shown in FIG. 3C. In FIG. 3C, a solid curve and a phantom curve respectively represent a specific operation particular to the present invention and a conventional operation. This is also successful to obviate defective fixation.

Figure 3D:
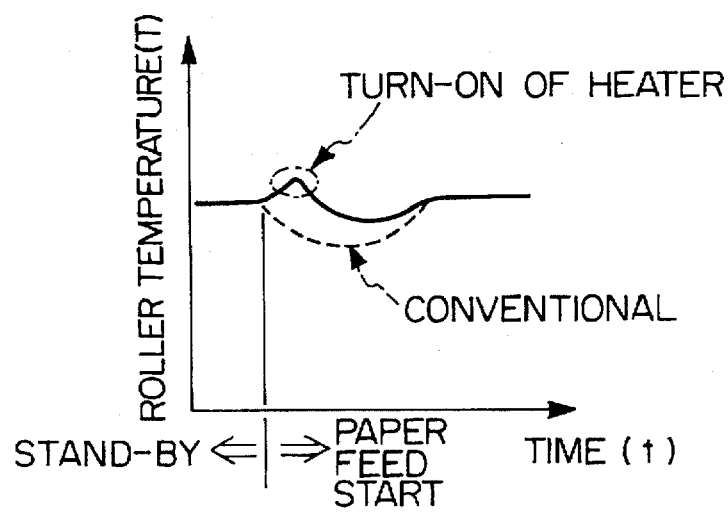

Besides the preliminary rotation, the heater of the heat roller 25 may be forcibly turned on, whether or not the heat roller 25 has reached the control temperature, when the first image is formed in the high-speed mode, as shown in FIG. 3D. In FIG. 3D, a solid curve and a phantom curve respectively represent a specific operation particular to the present invention and a conventional operation.

Figure 4A:
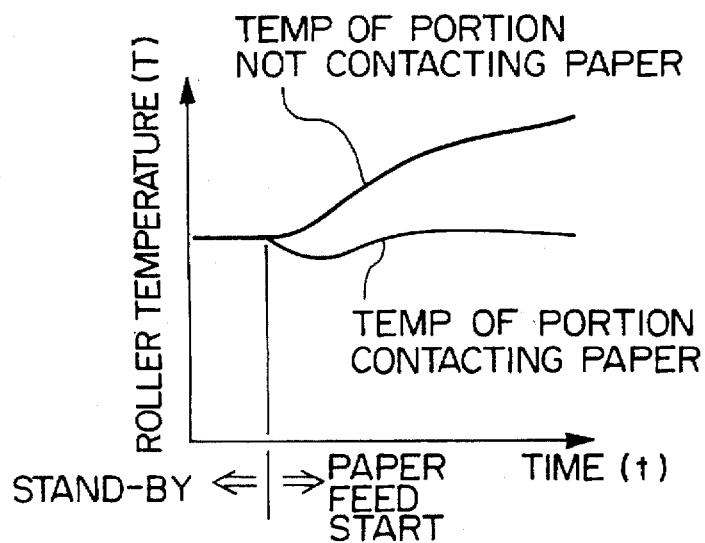
FIG. 4A is a graph indicating a drawback particular to the conventional apparatus and occurring when papers of relatively small size are continuously fed in the high-speed mode.
Figure 4B:
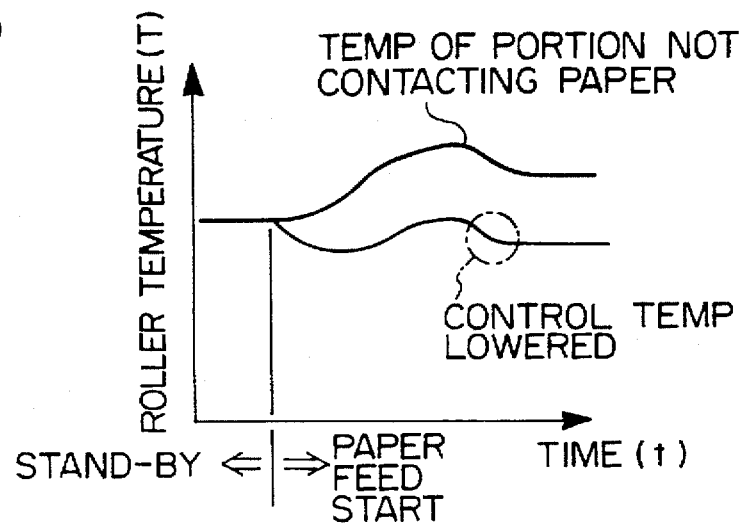
FIG. 4B is a graph representing an implementation of the present invention for eliminating the drawback shown in FIG. 4A.

In the high-speed mode, the turn-on rate of the heater of the heat roller 25 becomes higher than in the ordinary mode in order to maintain the roller 25 at the predetermined temperature. This brings about the previously discussed problems (2-1) and (2-2). Specifically, when a number of papers of relatively small size are continuously passed through the fixing unit 24 in the high-speed mode, the end portions of the heat roller 25 not contacting the papers are heated to a far higher temperature than in the ordinary mode, as shown in FIG. 4A. Such a temperature of the heat roller 25 reduces the life of bearings, among others. In addition, when a paper of relatively large size is passed through the fixing unit 24 just after a number of papers of relatively small size have been passed therethrough in the high-speed mode, a hot offset occurs at opposite edges of the paper. In accordance with the present invention, when a predetermined number of papers of small size are passed through the fixing unit in the high-speed mode, the control temperature of the heat roller 25 is lowered, as shown in FIG. 4B. As a result, the temperature of the heat roller 25 is prevented from rising to a degree which would reduce the life of bearings supporting the roller 25. At the same time, the above-mentioned hot offset is eliminated.

While the embodiment has been shown and described in relation to a digital copier, the present invention is practicable with any other kind of image forming apparatus which adopts an electrophotographic system, uses a heat roller, and has an ordinary mode and a high-speed mode.

In summary, it will be seen that the present invention provides an image forming apparatus having various unprecedented advantages, as enumerated below.

(1) A fixing unit is provided with a higher reload temperature in a high-speed mode than in an ordinary mode. Hence, a cold offset is eliminated at a start-up in the high speed mode.

(2) When the high-speed mode is selected, the fixing unit performs preliminary rotation at the time of a warm-up. This raises the temperature of a press roller and thereby obviates a cold offset in the event of a start-up in the high-speed mode.

(3) The control temperature of the fixing unit is higher in the high-speed mode than in the ordinary mode, so that defective fixation is eliminated in the high-speed mode. When the apparatus is in a stand-by state in the high-speed mode, the mode is automatically switched to the ordinary mode on the elapse of a predetermined period of time. As a result, the control temperature for the fixing unit is lowered to prevent the temperature inside the apparatus from rising.

(4) When papers of relatively small size are continuously passed through the fixing unit in the high-speed mode, the control temperature is lowered as soon as a predetermined number of papers is reached. This prevents the end portions of the heat roller not contacting the papers from being heated to a degree which would reduce the life of bearings. In addition, even when a paper of relatively large size is passed through the fixing unit just after the papers of small size, the end portions of the heat roller are free from a hot offset.

(5) When the operation mode is switched from the ordinary mode to the high-speed mode, the fixing unit performs preliminary rotation before image formation begins. Hence, defective fixation is obviated in the high-speed mode.

(6) In the high-speed mode, the heat source of the fixing unit is forcibly turned on without regard to whether or not the fixing unit has reached the control temperature. This also obviates defective fixation in the high-speed mode.

Various modifications will become possible for those skilled in the art after receiving the teachings of the present disclosure without departing from the scope thereof.

What is claimed is:

1. An image forming apparatus selectively operable in an ordinary mode for reading a document image every time an image is formed on an image carrier or in a high-speed mode for forming a plurality of images by a single reading while feeding papers at a shorter interval than in said ordinary mode, said apparatus comprising:

reading means for reading said document image and digitizing said document image;

storing means for storing the digitized document image;

image forming means for forming an image representing the digitized document image on the image carrier and for transferring said image from said image carrier to a paper;

a fixing roller for thermally fixing the image transferred to the paper; and control means for controlling an operation, a temperature, or the operation and the temperature of said fixing roller based on whether the ordinary mode or the high-speed mode is selected.

2. An apparatus as claimed in claim 1, wherein said control means controls the temperature of a heat roller included in said fixing roller such that a reload temperature is higher in the high-speed mode than in the ordinary mode.

3. An apparatus as claimed in claim 1, wherein said control means controls an operation of a heat roller included in said fixing roller such that said heat roller performs a preliminary rotation during a warm-up event in the high-speed mode.

4. An apparatus as claimed in claim 1, wherein said control means controls the temperature of said fixing roller such that said temperature is higher in the high speed mode than in the ordinary mode, and such that when a stand-by state continues over a predetermined period of time in the high-speed mode, said high-speed mode is automatically replaced with said ordinary mode to lower said temperature.

5. An apparatus as claimed in claim 1, wherein said control means controls the temperature of said fixing roller such that when papers of relatively small size are continuously passed through said fixing means in the high speed mode, said temperature falls as soon as a predetermined number of papers is reached.

6. An apparatus as claimed in claim 1, wherein said control means controls a heat roller included in said fixing roller such that when the ordinary mode is replaced with the high-speed mode, said heat roller performs preliminary rotation before an image is formed.

7. An apparatus as claimed in claim 1, wherein said control means controls a heat source included in said fixing roller such that said heat source is forcibly turned on in the high-speed mode without regard to the temperature of said fixing roller.

* * * * *